SAFETY CAP AND CONTAINER

Original Filed April 5, 1966 2 Sheets-Sheet 1

INVENTOR
PETER HEDGEWICK
BY
Barnes, Kisselle, Raisch & Choate
ATTORNEYS

SAFETY CAP AND CONTAINER

Original Filed April 5, 1966 2 Sheets-Sheet 2

INVENTOR
PETER HEDGEWICK
BY
Barnes, Kisselle, Raisch & Choate
ATTORNEYS

United States Patent Office

Re. 27,156
Reissued July 20, 1971

27,156

SAFETY CAP AND CONTAINER

Peter Hedgewick, Windsor, Ontario, Canada, assignor to Reflex Corporation of Canada Limited, Windsor, Ontario, Canada Original No. 3,344,942, dated Oct. 3, 1967, Ser. No. 540,338, Apr. 5, 1966. Application for reissue Apr. 19, 1968, Ser. No. 734,502
Int. Cl. B65d *55/02*
U.S. Cl. 215—9 25 Claims

Matter enclosed in heavy brackets [ ] appears in the original patent but forms no part of this reissue specification; matter printed in italics indicates the additions made by reissue.

ABSTRACT OF THE DISCLOSURE

The container disclosed herein comprises a cylindrical plastic body which is molded in one piece and has circumferentially spaced radially extending projections on the upper end thereof that have notches therein. The cap embodying the invention comprises a one-piece plastic body having a base and peripheral flange with circumferentially spaced lugs extending radially inwardly for engagement with the notches. An annular integral flexible web is provided on the inner surface of the base and extends downwardly and outwardly for engagement with the upper end of the container. An annular integral rib on the inner surface of the base overlies the annular flexible web and serves as a stop to prevent overflexing of the web. The base of the cap includes circumferential openings which facilitate its manufacture as a one-piece plastic cap but do not interfere with the sealing action of the annular web. The cap is applied to the container by a rotating movement. The cap can only be removed from the container by applying an axial force on the periphery of the cap and thereafter rotating the cap.

Background of the invention

This invention relates to safety caps and containers.

A serious problem that has long existed with respect to the handling of drugs is that the drugs are often packaged in containers that can be readily opened by children resulting in many serious injuries and deaths.

Among the objects of the invention are to provide a novel cap and container structure which cannot be readily opened so that children are deterred, if not prevented, from opening the containers; which is relatively simple and inexpensive; and which can be made by molding in cavities. More specifically, the objects of the invention are to provide a novel plastic cap that can be molded in one piece and a novel apparatus for making such a cap.

Summary

Basically, the container specifically comprises a cylindrical plastic body which can be molded in a one-piece mold and has circumferentially spaced radially extending projections on the upper end thereof that have notches therein. The cap embodying the invention comprises a one-piece plastic body having a base and peripheral flange with circumferentially spaced lugs extending radially inwardly for engagement with the notches. An annular integral flexible web is provided on the inner surface of the base and extends downwardly and outwardly for engagement with the upper end of the container. An annular integral rib on the inner surface of the base overlies the annular flexible web and serves as a stop to prevent overflexing of the web. The base of the cap includes circumferential openings which facilitate its manufacture as a one-piece plastic cap but do not interfere with the sealing action of the annular web. The cap is applied to the container by a rotating movement. The cap can only be removed from the container by applying an axial force on the periphery of the cap and thereafter rotating the cap.

Figure 1:
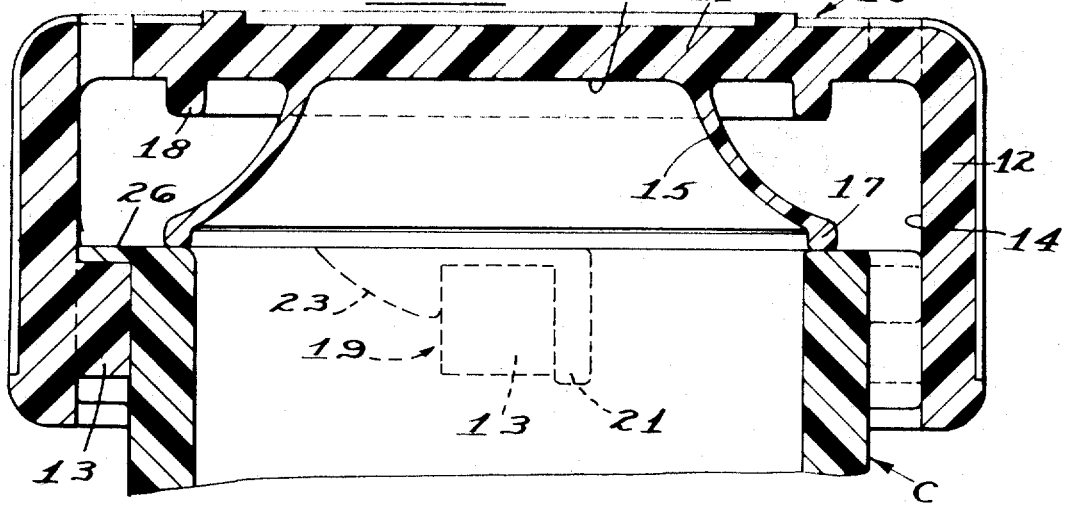
FIG. 1 is a fragmentary vertical sectional view of a container embodying the invention.

Referring to FIGS. 1–8, the invention comprises a cap 10 that is adapted to be applied to the upper end of a container C, each of which is molded by injecting plastic into a cavity, as presently described.

As shown in FIGS. 1 and 6–8, the cap 10 includes a base 11 and a peripheral flange 12 extending axially of the axis of the cap. A plurality of radially inwardly extending lugs 13 are provided on the inner surface 14 of the flange 12 adjacent the lower end thereof. An integral flexible resilient annular web 15 extends generally axially and radially outwardly from the inner surface 16 of the base 11 and is formed with an enlarged rib 17 on the free end thereof that is adapted to engage the upper end of the container C. An integral annular rib 18 extends axially from the inner surface 16 of the base 11 in generally overlying relation to the free end of the web 15.

Figure 5:
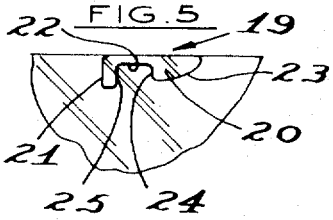
FIG. 5 is a fragmentary view of a portion of the upper end of the container.
Figure 6:
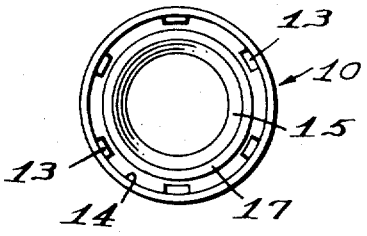
FIG. 6 is a bottom plan view of the cap.
Figure 7:
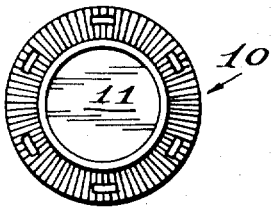
FIG. 7 is a top plan view of the cap.
Figure 8:
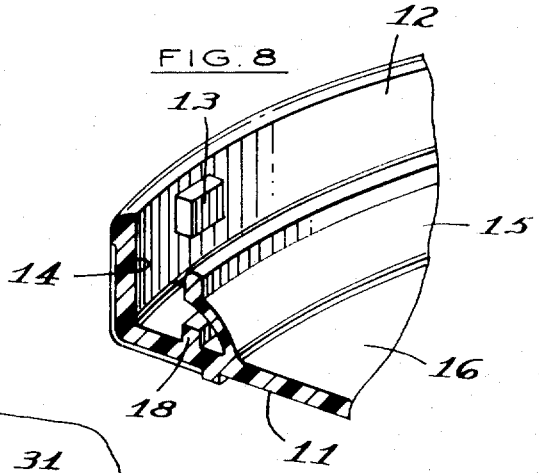
FIG. 8 is a fragmentary sectional perspective view of the cap.

The container C is generally cylindrical at least at the upper end and preferably throughout so that it can be made in a single cavity one-piece mold. The container C is formed at its upper end with a plurality of outwardly extending radial projections 19. As shown in FIG. 5, each radial projection 19 is formed with a first portion 20 and a circumferentially spaced second portion 21 to define a notch 22. The lower surface 23 of the first portion 20 is tapered gradually downwardly and circumferentially to blend in a smooth curve with the side wall 24 of the notch 22. The second portion 21 extends axially a greater distance from the upper end of the container to define the side 25 of the notch 22. The upper end of the container 11 is formed with a flat radial surface 26.

As further shown in FIGS. 1 and 6–8, the cap 10 is formed with a plurality of axially extending openings in the base 11 which overlie the lugs 13 and result from the apparatus for manufacture of the cap, as presently described.

In order to assemble the cap 10 on the container C, the cap is applied to the upper end of the container and rotated to bring the lugs 13 into engagement with the tapered surfaces 23 of the projections 19. Further rotation of the cap causes the lugs to follow the surfaces 23 producing a flexing of the web 15 intermediate its free edge and its base until the lugs engage the notches 22. In this position, the cap 10 is locked on the container C by the spring force of the web 15 and the bead 17 of the web 15 is in sealing engagement with the upper surface 26 of the container C as shown in FIG. 1. The base 11 of the cap 10 is of such a thickness that it will flex if a force is applied at the center of the base 11. The area of juncture of the base of the web 15 and the base 11 of the cap substantially overlies the upper end of the container.

Figure 2:
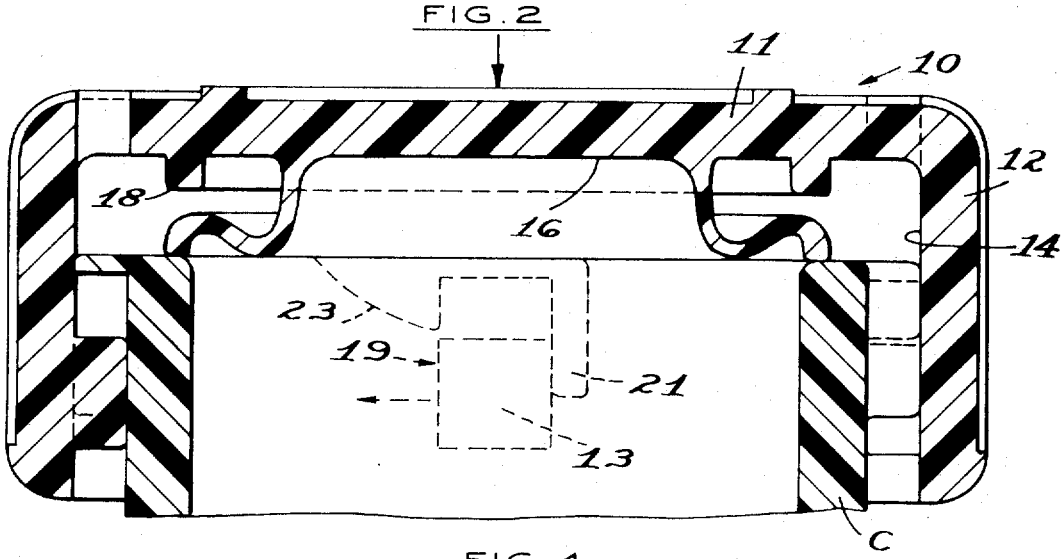
FIG. 2 is a view similar to FIG. 1 showing the relative positions of the parts as the container is being opened.
Figure 3:
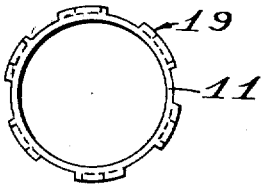
FIG. 3 is a plan view of the upper end of the container.
Figure 4:
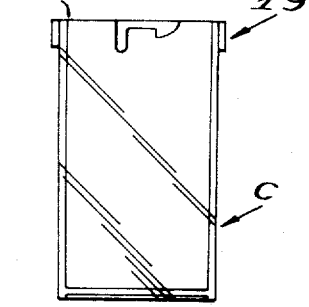
FIG. 4 is a side elevational view of the container.

The cap cannot be removed by a simple rotation so ıat children are deterred, if not prevented, from remov- ıg the cap. In order to remove the cap, an axial force ıust be provided on the periphery of the cap in the direc- on of the arrow as shown in FIG. 2 to cause a flexing f the web 15 and permit the lugs 13 to move axially and ıereby clear the portion 20 of the projections. After this xial force is applied, the cap can be turned in the direc- on of the arrow shown in FIG. 2 to permit its removal. ecause of the flexible nature of the base 11 of the cap, ıe axial force must be provided on the periphery of the ıp and not at the center of the cap. This force is most onveniently applied by pressing the container against the alm of the hand. In both applying and removing the cap, ıe rib 18 prevents overflexing of the web 15 beyond the astic limit which might cause a loss of resiliency or ›ring action of the web. In applying the cap, the greater xial extent of the portion 21 prevents rotating the cap eyond the notch 22. In removing the cap, the greater xial extent of the portion 21 prevents rotating the cap ı the wrong direction for removal.

The cap 10 is made of a suitable plastic material which rovides the desired flexibility of the integral web 15. A refererd material comprises polypropylene although other ıaterials such as polyethylene can be used. The container is also preferably made of a plastic. A preferred plastic ıaterial comprises a high impact styrene.

Figure 9:
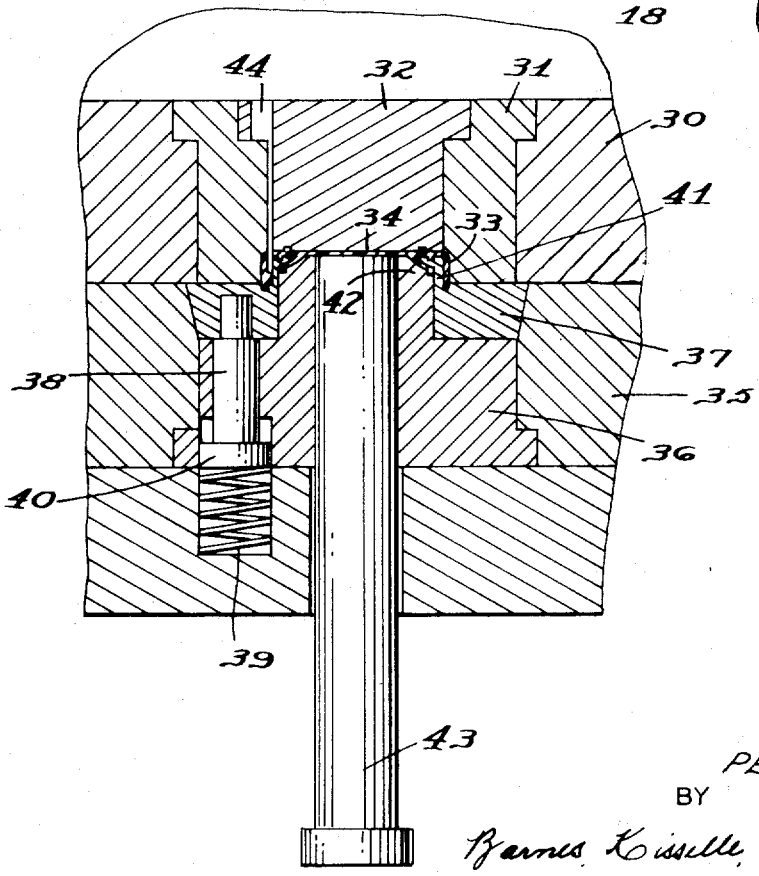
FIG. 9 is a fragmentary sectional view through an apparatus for molding the cap.

In order to make the cap in a single piece, an appara- ıs such as shown in FIG. 9 is used Referring to FIG. 9, ıe apparatus comprises a cavity retainer plate 30 in hich a cavity body 31 is fixed. The cavity body 31 in- ludes a cavity insert 32 so that a cavity is defined having surface 33 defining the outer surface of the flange of ıe cap and a surface 34 defining the outer surface of the ase of the cap.

The apparatus further includes a core retainer plate 35 ıat is movable axially relative to the cavity retainer plate nd supports a central core body 36 fixed to the plate 35 nd a stripper and core ring 37 which is movable axially elative to the core retainer plate 35. Specifically, a plu- ality of circumferentially spaced pins 38 are yieldingly rged upwardly by spring means 39 to in turn tend to rge the stripper and core ring 37 upwardly. An enlarged ead or shoulder 40 on the pins 38 limits the upward ıovement of the stripper and core ring 37.

The stripper and core ring 37 includes an annular up- ardly extending portion 41 that defines the inner surface f the flange 12 of the cap and a portion of the inner ırface 16 of the base 11 which includes the rib 18 and ıe outer surface of the web 15. The core body 36 in- ludes a central upwardly extending portion 42 that de- nes the inner surface of the web 15 and a portion of ıe inner surface 16 of the base 11 of the cap. Finally, ı ejector pin 43 defines the remaining portion of the ıner surface of the base of the cap.

A plurality of circumferentially spaced pin members 4 have their lower ends extending downwardly into the ›ace which defines the flange of the cap. The pin mem- ers 44 are adapted to engage the outer surface of the nnular portion 41 of the stripper and core ring 37. The ›wer ends of the pin members 44 define the upper sur- ıces of the lugs 13 of the cap.

In operation, the cavity retainer plate 30 is moved down- ardly relative to the core retainer plate 35 and causes ıe stripper and core ring 37 to more axially into the posi- on shown in FIG. 9 relative to the core retainer plate 35. lastic under pressure is introduced through a runner to ıold the cap. The cavity retainer plate 30 is then moved xially away from the core retainer plate. During this ıovement, the stripper and core ring 37 also moves axial- upwardly. Further movement of the cavity retainer plate 0 causes the cap to be stripped from the cavity of the avity body 31 leaving the cap on the stripper and core ng 37. Since the stripper and core ring 37 has moved upwardly relative to the core retainer plate 35 and core 36, the ejector pin 43 can then be moved upwardly to strip the cap from the stripper and core ring 37. The space that has been thus formed between the upper end 42 of the core body 36 and the annular projection 41 of the ring 37 is sufficient to permit flexing of the web 15 so that the stripping can take place.

It can thus be seen that there has been defined a novel cap and container construction which cannot be readily removed by a turning action, a novel cap construction which is one piece and a novel apparatus for forming such a one-piece cap. It will further be seen that the cap cannot be removed by applying pressure to the center of the cap by means of the thumb, and that the pressure must be applied to the outer periphery by means of the palm of the hand; thus adding greatly to the safety features.

What is claimed is:

1. An integral one-piece plastic cap having a base and a peripheral flange, a plurality of radially inwardly extending integral lugs on the inner surface of said flange, said lugs being adapted to engage notches on the upper end of a container, the base of said cap having axial openings therein overlying said lugs, the circumferential dimension and radial dimension of each said opening being substantially equal to the corresponding dimensions of the underlying lug, an integral annular web on the inner surface of the base of said cap extending downwardly when the cap is on the container.

2. The combination set forth in claim 1 wherein said integral annular web extends gradually downwardly and radially outwardly and is of such a thickness that it flexes upon relative axial movement between the cap and the container.

3. The combination set forth in claim 2 including an annular enlarged rib on the free end of said web.

4. The combination set forth in claim 1 wherein the base of said cap has inherent flexibility whereby pressure must be applied to the outer periphery of the cap in order to disengage the lugs on the cap from notches on the upper end of a container.

5. The combination comprising a container having a plurality of circumferentially spaced projections extending radially outwardly from the upper end thereof, each said projection having a downwardly facing notch therein, and a cap having a base and a peripheral flange, a plurality of radially inwardly extending lugs on the inner surface of said flange.

said lugs being adapted to engage the notches on the projections of the container, an annular flexible web on the inner surface of the base extending downwardly and engaging the upper end of the container when the cap is on the container, and stop means on the inner surface of the base of the cap, said stop means extending axially of the cap and serving as a stop for limiting the flexing action of the annular web, said base of said cap having axial openings therein overlying said lugs.

6. A cap having a base and a peripheral flange, a plurality of radially inwardly extending lugs on the inner surface of said flange, said lugs being adapted to engage notches on the upper end of a container, an annular flexible web on the inner surface of the base extending downwardly and adapted to engage the upper end of a container when the cap is on the container, and stop means on the inner surface of the base of the cap, said stop means extending axially of the cap and serving as a stop for limiting the flexing action of the annular web, the base of said cap having axial openings therein overlying said lugs.

7. The combination comprising a container having a plurality of circumferentially spaced projections extending radially outwardly from the upper end thereof, each said projection having a downwardly facing notch therein, an integral one-piece plastic cap having a base and a peripheral flange, a plurality of radially inwardly extending integral lugs on the inner surface of said flange, said lugs being adapted to engage notches on the upper end of a container, said cap having axial [opening] *openings* therein overlying said lugs, the circumferential dimension and radial dimension of each said opening being substantially equal to the corresponding dimensions of the underlying lug, an integral annular web on the inner surface of the base of said cap extending downwardly when the cap is on the container.

8. An integral one-piece plastic cap having a base and a peripheral flange, a plurality of radially inwardly extending integral lugs on the inner surface of said flange, said lugs being adapted to engage notches on the upper end of a container.

said cap having axial openings therein overlying said lugs, the circumferential dimension and radial dimension of each said opening being at least as great as the corresponding dimensions of the underlying lug, said cap having an integral portion depending therefrom and adapted to engage the container so that the cap is stressed when the cap is on the container to hold said lugs in the notches.

9. The combination set forth in claim 8 wherein the base of said cap has inherent flexibility whereby pressure must be applied to the outer periphery of the cap in order to disengage the lugs on the cap from notches on the upper end of a container.

*10. A one-piece safety cap of the type adapted to be applied to and removed from the end of a container by an axial motion followed successively by a rotative motion relative to such container, said cap comprising a base and a peripheral flange, locking means on said flange adapted to engage latching means on an end of a container, and a flexible web joined to said base and extending axially and radially outwardly therefrom and terminating in a free end adjacent said flange for engagement with an end of a container when said cap is mounted thereon, said web being operable to yieldingly urge said locking means and latching means into axial engagement when said cap is mounted on the container.*

*11. The cap as defined in claim 10 wherein said locking means comprises a plurality of radially inwardly extending lugs on the inner surface of said flange and said latching means comprises notches on the end of a container adapted to receive said lugs, said cap having axial openings therein overlying said lugs, the circumferential and radial dimensions of each said opening being at least as great as the corresponding dimension of the underlying lug.*

*12. The cap as defined in claim 10 further comprising stop means on the inner surface of said cap engageable with said web to limit movement of the latter toward said base of said cap.*

*13. A one-piece safety cap of the type adapted to be applied to and removed from the end of a container by an axial motion followed successively by a rotative motion relative to such container, said cap comprising a base and a peripheral flange, locking means on said flange adapted to engage latching means on an end of a container, and a flexible web joined to said base and extending axially and radially outwardly therefrom and terminating in a free end adjacent said flange for engagement with an end of a container when said cap is mounted thereon, said web being operable to yieldingly urge said locking means and latching means into axial engagement when said cap is mounted on the container, said web being flexible intermediate said free end thereof and said base whereby said free end moves substantially solely axially relative to said base when said peripheral flange is moved axially relative to the container.*

*14. A one-piece safety cap of the type adapted to be applied to and removed from the end of a container by an axial motion followed successively by a rotative motion relative to such container, said cap comprising a base and a peripheral flange, locking means on said flange adapted to engage latching means on an end of a container, and a flexible web joined to said base and extending axially and radially outwardly therefrom and terminating in a free end adjacent said flange for engagement with an end of a container when said cap is mounted thereon, said web being operable to yieldingly urge said locking means and latching means into axial engagement when said cap is mounted on the container, the central portion of said base being flexible whereby a pressure applied thereto may flex said central portion axially relative to said flange without depressing the latter sufficiently to disengage said locking means from the latching means on the container.*

*15. A one-piece safety cap of the type adapted to be applied to and removed from the end of a container by an axial motion followed successively by a rotative motion relative to such container, said cap comprising a base and a peripheral flange, locking means on said flange adapted to engage latching means on an end of a container, and a flexible web joined to said base and extending axially and radially outwardly therefrom and terminating in a free end adjacent said flange for engagement with an end of a container when said cap is mounted thereon, said web being operable to yieldingly urge said locking means and latching means into axial engagement when said cap is mounted on the container, said web being flexible intermediate said free end thereof and said base whereby said free end moves substantially solely axially relative to said base when said peripheral flange is moved axially relative to the container, the central portion of said base being flexible whereby a pressure applied thereto may flex said central portion axially relative to said flange without depressing the latter sufficiently to disengage said locking means from the latching means on the container.*

*16. The cap as defined in claim 15 wherein said locking means comprises a plurality of radially inwardly extending lugs on the inner surface of said flange and said latching means comprises notches on the end of a container adapted to receive said lugs, said cap having axial openings therein overlying said lugs, the circumferential and radial dimensions of each said opening being at least as great as the corresponding dimensions of the underlying lug.*

*17. The cap as defined in claim 15 further comprising stop means on the inner surface of said cap engageable with said web to limit movement of the latter toward said base of said cap.*

*18. A one-piece safety cap of the type adapted to be applied to and removed from the end of a container by an axial motion followed successively by a rotative motion relative to such container, said cap comprising a base and a peripheral flange, a plurality of radially inwardly extending lugs on the inner surface of said flange adapted to engage notches on the end of a container, said cap having axial openings therein overlying said lugs, the circumferential and radial dimensions of each said opening being at least as great as the corresponding dimen-*

*ons of the underlying lug, and yieldable means carried y said cap and engageable with the end of a container hen said cap is mounted thereon, said yieldable means eing operable to urge said lugs into engagement with the otches on the end of a container.*

*19. The cap as defined in claim 18 further comprising op means on the inner surface of said cap engageable ith said yieldable means to limit movement of the lat- r toward said base of said cap.*

*20. A safety cap of the type adapted to be applied and removed from a container by an axial motion llowed successively by a rotative motion relative to such ntainer, said cap comprising a base and a peripheral ange, locking means on said flange adapted to engage tching means on a container, and yieldable means car- ed by said cap and engageable with a container when id cap is mounted thereon, said yieldable means being perable to urge said locking means into axial engage- ent with said latching means when said cap is mounted n the container, said yieldable means being yieldable response to axial pressure applied to said cap at said eripheral flange to disengage said locking means from te latching means on the container, the central portion f said base being flexible whereby a pressure applied ereto may flex said central portion axially relative to id peripheral flange without depressing the latter suffi- ently to disengage said locking means from the latch- g means on the container.*

*21. A one-piece safety cap of the type adapted to be pplied to and removed from a container by an axial mo- on followed successively by a rotative motion relative such container, said cap comprising a base and a pe- pheral flange, locking means on said flange adapted to- ngage latching means on a container, and an annular eldable web joined to said base and projecting there- om for engagement with a container when said cap is ounted thereon, said web being operable to urge said cking means into axial engagement with said latching eans when said cap is mounted on the container, said eb being yieldable in response to axial pressure applied said cap at said peripheral flange to disengage said lock- g means from the latching means on the container, the entral portion of said base being flexible whereby a pres- ure applied thereto may flex said central portion axially elative to said peripheral flange without depressing the lat- r sufficiently to disengage said locking means from the tching means on the container.*

*22. The cap as defined in claim 21 wherein said lock- g means comprises a plurality of radially inwardly ex- nding lugs on the inner surface of said flange and said tching means comprises notches on the end of a con- iner adapted to receive said lugs, said cap having axial penings therein overlying said lugs, the circumferential nd radial dimensions of each said opening being at least s great as the corresponding dimensions of the underlying g.*

*23. The cap as defined in claim 21 further comprising op means on the inner surface of said cap engageable ith said web to limit flexible movement of the latter ward said base of said cap.*

*24. A safety package for medicines and other poten- ally dangerous substances including: a container having mouth portion with an annular rim; a cap having a base ith a peripheral flange projecting axially therefrom for*

*receiving said mouth portion; a plurality of container locking elements spaced peripherally from each other on the outer wall of said mouth portion; a plurality of cap locking elements spaced peripherally from each other on the inner wall of said flange; said cap locking elements being engageable with and disengageable from said container locking elements by combined axial and rotative motion of the cap relative to the container; said cap locking elements being located an equal axial distance from said base and said container locking elements being located an equal axial distance from said rim whereby said base has a fixed axial position relative to said rim when the locking elements are engaged; and means for exerting a biasing force between the cap and container to urge the locking elements into engagement with each other, characterized by said means for exerting a biasing force comprising a hollow web of annular cross-section having an inner annular end joined integrally to said base, said web extending axially from said base toward the container and terminating in an outer annular free end, said web being constructed to have sufficient resistance to movement of said outer annular free end toward said inner annular end to apply said biasing force and maintain said cap in said fixed axial position relative to said container.*

*25. A one-piece safety cap of the type adapted to be applied to and removed from a container by an axial motion followed successively by a rotative motion of the cap relative to such container, said cap comprising: a base and a peripheral flange extending axially from said base; a plurality of locking elements spaced from each other on the inner wall of said flange and located an equal axial distance from the base of the cap, said locking elements being adapted to engage latching means on a container, and biasing means for applying a constant axial force between the cap and a container; characterized by said biasing means comprising a hollow web of annular cross-section having an inner annular end joined integrally to said base, said web extending axially from said base and terminating in an outer annular free end, said web being constructed to have sufficient resistance to deflection of said outer annular free end toward said inner annular end to apply said biasing force.*

References Cited

The following references, cited by the Examiner, are of record in the patented file of this patent or the original patent.

UNITED STATES PATENTS

| | | | |
|---|---|---|---|
| 2,776,066 | 1/1957 | Thornton | 215—44 |
| 3,248,025 | 4/1966 | Santore | 215—56X |
| 3,158,553 | 11/1964 | Carski | 215—44X |

FOREIGN PATENTS

| | | | |
|---|---|---|---|
| 1,213,812 | 11/1959 | France | 215—(Fin) |
| 788,148 | 12/1957 | Great Britain | 215—43(1067) |
| 969,322 | 9/1964 | Great Britain | 215—43(1463) |

OTHER REFERENCES 1,107,541, May 1961, Germany, Fischbach, 215 (Fin) (printed application).

DONALD F. NORTON, Primary Examiner